United States Patent [19]
Taylor

[11] 3,975,099
[45] Aug. 17, 1976

[54] OPTICAL NULL APPARATUS

[75] Inventor: Leonard Harold Taylor, Loudwater, England

[73] Assignee: Perkin-Elmer Limited, Beaconsfield, England

[22] Filed: June 16, 1975

[21] Appl. No.: 587,098

[52] U.S. Cl.................................. 356/89; 250/343; 350/266; 350/273; 356/51
[51] Int. Cl.² ..................... G01N 21/34; G01J 3/42; G05D 25/00
[58] Field of Search.................... 350/266, 271, 273; 356/51, 89; 250/343

[56] References Cited
UNITED STATES PATENTS

| | | | |
|---|---|---|---|
| 3,013,470 | 12/1961 | Pliskin | 350/266 |
| 3,347,616 | 10/1967 | Mori et al. | 350/271 |

*Primary Examiner*—Alfred E. Smith
*Assistant Examiner*—T. N. Grigsby
*Attorney, Agent, or Firm*—S. A. Giarratana; F. L. Masselle; J. M. O'Meara

[57] ABSTRACT

A correction system is disclosed for double-beam spectrophotometers of the optical nulling type in which a mechanical radiation attenuator is positionally adjusted in the path of the reference beam by means of an error signal proportional to the detected difference in intensity and between the sample and reference beams. The attenuator takes the form of a circular sector mounted for angular displacement about an axis through the sector circle center by a servomotor in response to the error signal. The sector contains one or more wedge-shaped apertures arcuately disposed about said center so that the reference beam passes through the apertures and is partially (or totally) occluded in accordance with the angular position of the sector. In order to correct for quadratic non-linearities in the instrument output, a generally sinusoidal correction factor is mechanically superimposed on the instrument's measuring characteristic by enabling adjustable displacement of the servomotor rotational drive axis from alignment with said axis of rotation of the circular sector.

13 Claims, 3 Drawing Figures

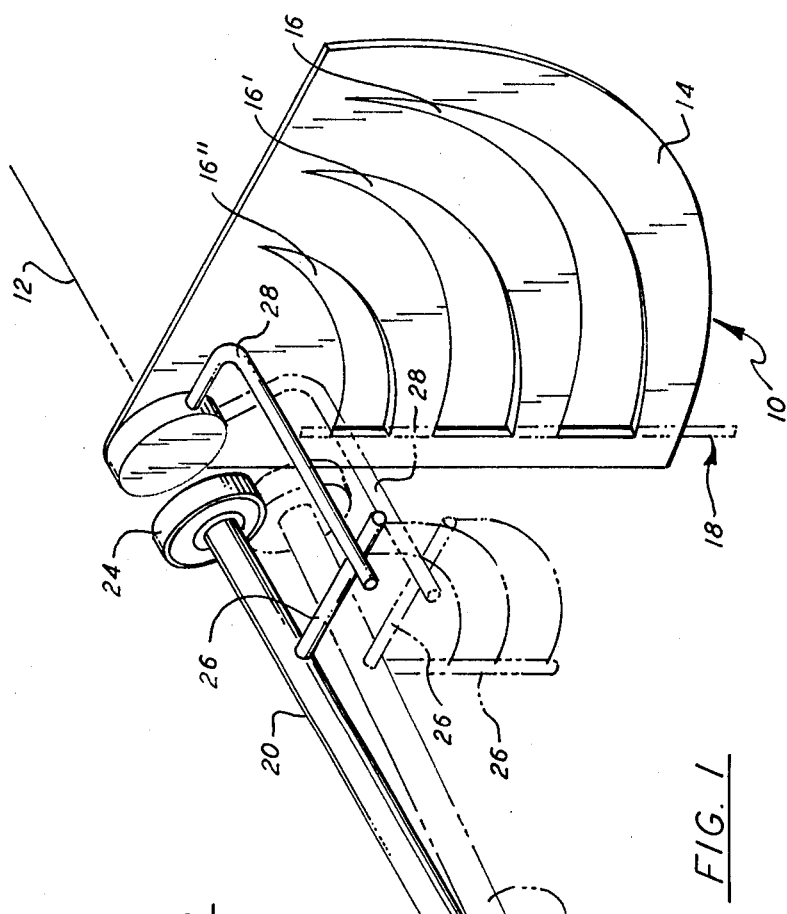
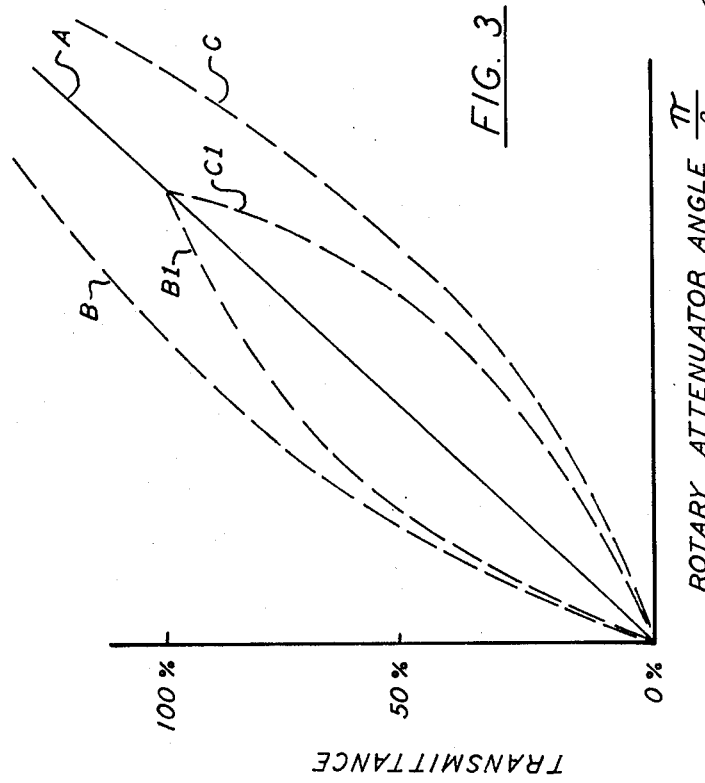
FIG. 1
FIG. 3

OPTICAL NULL APPARATUS

BACKGROUND OF THE INVENTION

1. Field of the Invention

This invention relates to radiation measuring apparatus based on the optical null principle and is particularly concerned with the minimization of radiation measuring non-linearities which are substantially quadratic to a first order.

2. Description of the Prior Art

In a known double-beam infrared spectrophotometer described herein for the purposes of illustrating a typical application of the present invention, the optical null mode ensures that the measurement of the radiation transmitted or absorbed by a sample under analysis is substantially unaffected by any disturbances which are common to a measuring channel and a reference channel divaricating from a single infrared source respectively into a measuring station (accommodating the measuring sample) and a reference station (accommodating a reference sample) and combining past the stations into a common channel leading to an infrared detector. The common channel is time shared equally by the infrared beams issuing from the two stations, i.e., the detector "looks" at the reference beam emerging from the reference sample half the time and the measuring beam emerging from the measuring sample the other half. The detector outputs arising in two successive half-times are compared and the difference is used to servo an actuator device which will position a comb attenuator in the reference channel until a balance is attained, when the two outputs will have been made equal in amplitude. A pen linked in motion with the attenuator records transmittance (or absorbance) as the ordinate on a chart moved in synchronism with the wavelength (or wavenumber) scan to represent the abscissa.

A radiation source often used for spectroscopic work in the infrared takes the form of a rod of suitable electrically resistive material which when heated by the passage of an electric current from end to end emits an infrared continuum in the spectral region for which the spectrophotometer is designed. The luminance of such source is greatest around the mid-point thereof and tends to drop off at either side of it in a substantially symmetrical manner, as each of the two end terminals is approached. The effect, which is due to the thermal loading imposed by the terminals, can be minimized by having a comparatively long rod and using as the effective source a small medial segment, well away from the terminals. Unfortunately, even at the limit of this approach that is acceptable in practice, the source is still marred by a central hot spot.

The comb attenuator in the reference channel should ideally be located where the radiation beam has the most uniform energy distribution. From this viewpoint alone, a pupil image obviously qualifies because of its inherent radiation scrambling, although the surface imperfections that can be tolerated in the dispersing elements become much smaller. When overall instrument design considerations are taken into account, however, there are situations where the slit image is a more convenient location. In the known double-beam infrared spectrophotometer under consideration, the reference comb is positioned at a slit image, so that a point-for-point correspondence exists between the source and its image at the comb.

When the detector looks into the measuring channel, it receives at all times an energy contribution from every single point of the effective source. when it looks into the reference channel, it receives a similar contribution only if the reference attenuator is substantially out of the beam. If the point of photometric balance between the two beams requires the reference attenuator to intercept a significant part of the reference beam, then the detector will not receive any contribution from those areas of the effective source which are masked by the intercepting opaque portions of the comb.

If it is assumed that initially the reference comb is positioned to correspond to an ordinate near the 100 percent transmission mark with, say, the tips of the middle fingers at the boundary of the hot spot image, and that as the scanning proceeds the absorbance exhibited by the sample increases gradually, the rate of angular rotation of the comb required for maintaining photometric balance will not be linearly related to the rate of absorbance change but it will be lower than that required for a linear relation at first, while the middle fingers are cutting off more and more of the hot spot contribution, and then will pick up again when such contribution declines. It has been determined that the ordinate non-linearity thus resulting from the effect of the source hot spot is quadratic to a first order.

Quadratic non-linearities of the ordinate may arise from other causes as well, such as uneven response of the detector over its effective sensitive area. Detectors utilizing semiconductor thermocouples, for example, exhibit peak sensitivities near the two ohmic contacts. Considering one of such detectors in combination with an infrared source, assumed for simplicity to have uniform luminance throughout its effective length, it may reasonably be deduced that, as the reference attenuator intercepts more and more of the rays which the highly sensitive areas were receiving, comparatively greater attenuator changes will be required for achieving the balance point, since the detector response becomes increasingly dependent on the contribution of the less sensitive areas.

It is true that some types of detectors, e.g., Golay cell, have substantially uniform sensitivities over their entire effective area, but the thermocouple detector is a good choice in the wavelength region extending between, say, 2.5 and 50 microns.

Another possible cause of quadratic non-linearity is the bowing of the comb attenuator, but this and the vignetting, which may occur near the edges of either beam, are of secondary importance in a properly designed and aligned spectrophotometer.

It will be appreciated, therefore, that in designing a radiation measuring instrument of the optical-null type, which involves the servo-controlled displacement of some form of optical attenuator, it is not possible to predict with accuracy the nature and the extent of the measuring non-linearities. In general, however, said non-linearities are often quadratic to a first order and, therefore, capable of being reduced by utilization of the present invention.

Spectrophotometers perhaps represent the largest class of instruments that can benefit from the invention — some more than others, depending on accident of design. While the invention is described herein with specific reference to infrared spectrophotometers, UV spectrophotometers, or other radiometric devices, may also be susceptible to quadratic non-linearities which can be mitigated by application of the invention.

SUMMARY OF THE INVENTION

To the elimination or mitigation of the problems outlined above, the present invention contemplates a radiation measuring apparatus of the optical nulling type, including corrector means for enabling a substantial compensation to be made for radiation measuring non-linearities that are quadratic to the first order.

In accordance with a particular feature of the invention, the radiation measuring apparatus includes means for divaricating radiation from a source into a reference beam and a sample beam. A mechanical radiation attenuator, effective by positional adjustment, is disposed to intercept and regulate the intensity of the reference beam. A drive means is provided for the positioning of the attenuator and operably connected thereto by way of an adjustable coupling means which superimposes on the drive a generally sinusoidal correction function.

BRIEF DESCRIPTION OF THE DRAWINGS

FIG. 1 is a perspective schematic view illustrative of the basic constructional principle of a corrector in accordance with the present invention as applied to an infrared optical null type spectrophotometer;

FIG. 3 is a graph illustrating generally quadratic non-linearities.

DESCRIPTION OF THE PREFERRED EMBODIMENT

Figure 2:
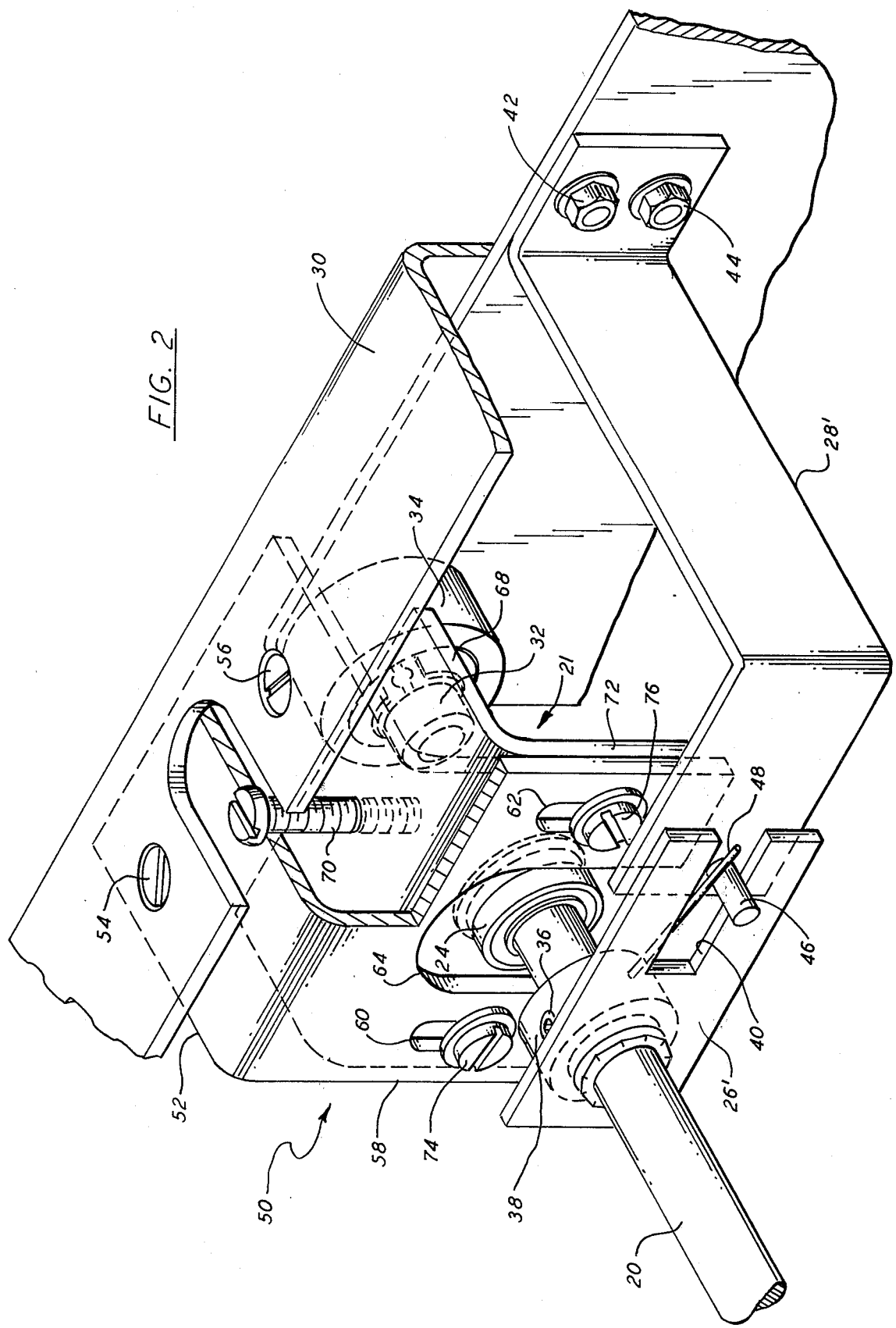
FIG. 2 is a partial perspective view showing a practical embodiment of the principle illustrated in FIG. 1.

The spectrometer to which the above-described drawings relate is of the same general construction referred to earlier and includes a heated rod radiation source and a semiconductor thermocouple detector as mentioned. Consequently, the quadratic non-linearities will, in fact, be the quadratic result of at least two interacting quadratic non-linearities. The means for correcting them in accordance with a specific embodiment of the invention as described below will henceforth be called an ordinate corrector.

Referring now to the drawing and first in particular to FIG. 1, there is depicted in schematic form, sufficient basic structure to facilitate an explanation and understanding of the underlying concepts of the invention. The components of this basic structure include a mechanical attenuator 10 mounted for rotation about an axis 12 by means of a shaft (not shown). Attenuator 10 is wedge-type attenuator of conventional configuration consisting of a quadrant or 90° circular sector 14 of thin sheet metal containing a plurality of wedge-like apertures, 16, 16', 16'' arcuately curved concentrically about the axis 12 of rotation at differing radial distances therefrom. Three apertures are shown to facilitate illustration but in actual practice a larger number may be employed.

Attenuator 10 is effective by positional adjustment to control the intensity of the reference beam; to this end, it is disposed in the reference beam substantially at the slit image, i.e., in the plane at which the radiation source (not shown) is imaged by a suitable optical system (also not shown). The image of the source is symbolically represented at 18 as an aid to explanation of attenuator operation.

With attenuator 10 in the limit position shown in FIG. 1, the broad ends of wedge apertures 16, 16' . . . confront the source image; under these conditions, transmittance is at a maximum and will be considered 100 percent. When sector 14 is rotated by some 90° clockwise about axis 12 to its other limit position, the source image is occluded so that transmittance is nil. The configuration of apertures 16, 16', . . . is such as to provide an energy transmission factor varying substantially linearly with sector angle of rotation between its 0 and 100 percent transmittance positions.

The angular displacement of attenuator sector 14 is effected by means of a drive means including a rotary shaft 20 coupled to a servomotor (not shown). (The recorder pen of the spectrophotometer is, of course, slaved to the angular rate of the servomotor.) Shaft 20 has its ends journaled in ball bearings 22, 24 which define for the shaft rotational axis a "normal" or "zero" position in which such axis is coincident with axis 12. A driving connection is established between shaft 20 and attenuator sector 14 and is represented in FIG. 1 by a radial pin 26 on shaft 20 engaging an L-shaped arm 28 on sector 14. A bias spring (not shown) urges arm 28 against pin 26. Thus, it will be seen that the driving connection between shaft 20 and sector 14 is spaced radially from the rotational axis 12 of the sector.

In the position shown in solid lines, shaft 20 is aligned with the axis of rotation of sector 14 in a manner equivalent to that found in prior art spectrophotometers wherein the attenuator is driven by the attenuator servo directly and no ordinate correction in accordance with the present invention is possible.

By means of a mechanical arrangement to be described presently, shaft 20 can be displaced so that its axis no longer coincides with attenuator axis 12, displacement preferably being in a plane defined by the axis 12 and the longitudinal axis of source image 18. In the position shown in dotted lines, shaft 20 has been tilted downwards, pivoting taking place at bearing 22, the races of which are sufficiently slack for the purpose. A certain amount of correction determined by the angle of tilt is thus affected. By making this angle adjustable, the correction giving optimum results can easily be made.

In the illustrated embodiment, displacement of shaft 20 is effected by tilting the shaft about a center coinciding with bearing 22. Downward displacement of shaft 20 from the position of alignment with axis 12 causes sector 14 to rotate in a clockwise direction as shown by the dotted image of the arm 28 bearing on the dotted image of the radial pin 26. It follows that the displacement causes a shift in the setting of the 100 percent transmittance point on the ordinate scale. This is of no consequence since the setting is easily adjusted by moving an attenuator in the measuring (sample) beam. A slight compression of the ordinate scale is also brought about because the reference attenuator is rotated by something less than 90° for a 90° rotation of shaft 20. Again, the compression is of no practical consequence.

Adjustment of the zero transmittance limit is usually somewhat critical in any spectrophotometer, because the attenuator servo tends to go "dead" and drift when the output of the detector is very small. By ensuring that the intersection between the radial pin 26 and the arm 28 lies in the plane (defined by axis 12 and source image 18) referred to above when attenuator sector 14 is rotated in a clockwise direction to the position of 0 transmittance, downward displacement of shaft 20 in said plane in no way affects the zero setting, since the displacement imparts no angular motion to the attenuator sector.

It will be understood, therefore, that the presence of the ordinate corrector causes no problem in the setting of the transmittance limits. It will now be explained how the principle illustrated in FIG. 1 can be used to correct for the positive angular error referred to earlier in this description.

If the angular position of shaft 20 as shown in dotted lines in FIG. 1 is rotated some 90° in a clockwise direction, source image 18 will be across the narrow tip regions of wedge apertures 16, 16',... Bearing in mind that the attenuator error sought to be corrected is that which, in an uncorrected spectrophotometer, causes the attenuator to swing from zero to 100 percent transmission at a rate of angular travel which is greater than the design rate, it will be noted that by rotating shaft 20 clockwise to bring sector 14 back to the position shown in FIG. 1, the angular rate of the wedge has been slowed down in accordance with a sinusoidal function extending over a quarter wave (i.e., $\pi/2$ radians). It has been found that, even if no accurate symmetrical match can be achieved between the error and the correction, a correctly phased sinusoidal function is a good enough approximation to allow in most cases a very useful reduction of quadratic non-linearities of the ordinate.

If the attenuator error were negative, it would naturally be arranged for the displacement to be operative in the opposite direction to that shown in FIG. 1, i.e., the sign of the correcting function would be changed.

It should perhaps be observed here that the attenuator characteristic of the uncorrected spectrophotometer in the present embodiment, i.e., with axis shaft 20 coincident with axis 12, was a curve rising quadratically towards a maximum around the 100 percent transmittance point, if this point was not set. When the zero and 100 percent limits are set, there cannot be any error at these limits and the characteristic acquires a hump somewhere around the 50 percent transmittance mark, as would be expected. After correction in accordance with the invention, the hump is much reduced. The manner in which the ordinate corrector is adjusted, although foreshadowed in the description of the general principle of correction illustrated in FIG. 1, is better appreciated in the context of a practical embodiment of the corrector depicted in FIG. 2 wherein parts in common with FIG. 1 are identified by corresponding reference numerals.

The ordinate corrector depicted in FIG. 2 comprises an attenuator sector 14 mounted for rotation with respect to a spectrophotometer frame member 30 about the axis 12 of a shaft 32 to which it is keyed through a boss 34. A drive shaft 20 is journaled for rotation about an axis defined by spaced ball bearings as already described and shown in FIG. 1, one such bearing, 24, appearing in FIG. 2.

A radial arm 26' is fixed to shaft 20 by means of a set screw 36 extending through a boss 38 on the fixed end of the arm. At its free end, arm 26' contains an open-ended slot 40. An L-shaped bracket 28' has one leg extending parallel to axis 12 and its free end fixed to attenuator sector 14 as by screws 42, 44. Thus secured, the other leg of bracket 28' extends radially toward shaft 20 and, adjacent its free end, carries a pin 46 slidably engaged in slot 40 of radial arm 26' to establish a lost motion coupling. A length of resilient wire 48 transfixed through boss 38 urges pin 46 into contact with one side of slot 40.

A downward (outer) L-shaped bracket 50 has its upper leg 52 secured to frame member 30 by screws 54, 56 and its depending leg 58 provided with elongated slots 60, 62 and an arch-like cut-away 64 for straddling shaft 20. A second (inner) downturned, L-shaped bracket 66 nested into and behind L-shaped bracket 50 has its upper leg 68 provided with a tapped hold for receiving and adjusting screw 70, the head of which abuts against the upper leg 52 of bracket 50, apertured to allow free passage of the shank of the screw. The depending leg 72 of bracket 66 is bored to receive bearing 24 and is provided with tapped holes to receive screws 74, 76 passing through slots 60, 62.

It will now be appreciated that if screws 74 and 76 are loosened, rotation of screw 70 in a clockwise direction (if the screw is right-handed) will move bracket 66 upwards, the depending limb 72 of the bracket sliding over the depending limb 58 of bracket 50. Counter-clockwise rotation will, of course, allow a downward movement of bracket 66. Since bracket 66 supports through the bearing 24 the end of the shaft 20 proximate sector 14, any up or down movement of bracket 66 alters the angle of tilt of shaft 20 in a plane that includes the axes of the shaft and image 18. The other end of shaft 20 is mounted in slack ball bearing 24 (FIG. 1) supported in a frame part and thus providing a pivoting point.

Now, if screw 70 is initially set so that the shaft 20 is aligned with the shaft 32, it is possible to correct for attenuator error whatever the sign by turning the screw the proper amount in one direction or the other. Screw 70 would normally be adjusted by the manufacturer of the spectrophotometer and would not need to be altered unless such parts as the source and the detector are replaced or the instrument is undergoing major servicing. Once the setting has been effected, it will be made secure by tightening screws 74, 76.

In the graph of FIG. 3, ordinate valves (transmittance values indicated by way of example) have been plotted against rotary attenuator angles. Curve A shows the ideal linearity of the ordinate. Curves B and C show generally quadratic non-linearities of similar amplitude but opposite sign, before the 100 percent transmittance limit is set. Curves $B_1$ and $C_1$ correspond to curves B and C, respectively, after the 100 percent limit has been fixed. Both curves display a hump towards the 50 percent mark for the reason explained earlier. By superimposing a generally sinusoidal correcting function having an amplitude proportional to the height of the hump and the correct sign to be operative against the hump, it is possible in accordance with the present invention to improve the generally quadratic non-linearities depicted by the two curves by effectively reducing the hump of the curve bearing one or other sign until the corrected curve becomes a much closer approximation of curve A. In this context, the sign of a curve is assumed to be relative to curve A, which represents the datum.

What is claimed is:

1. In combination with a radiation measuring apparatus of the optical null type including means for divaricating radiation from a source into a reference beam and a sample beam:

a. a mechanical radiation attenuator effective by positional adjustment to control the intensity of said reference beam;

b. drive means for positionally adjusting the attenuator in the reference beam to vary the degree of attenuation thereof in response to differences in intensity between said reference and sample beams; and c. mechanical corrector means coupled in said drive means for superimposing a generally sinusoidal correcting function on the positioned adjustment of said attenuator and, concomitantly, on the measuring characteristics of the apparatus to reduce any non-linearities of a generally quadratic function that might be present in said characteristic.

2. The combination defined in claim 1 wherein said corrector means includes an adjustable coupling between said drive means and attenuator enabling adjustment of the amplitude and/or sign of the sinusoidal correcting function.

3. The combination defined in claim 2 wherein the attenuator is a rotary attenuator mounted for rotational adjustment by said drive means, and said drive means includes a rotary drive member drivingly connected to the attenuator by said adjustable coupling.

4. The combination defined in claim 3 wherein said adjustable coupling enables displacement of the rotational axis of said rotary drive member relative to the axis of rotation of the attenuator.

5. In combination with a radiation-measuring apparatus of the optical null type including means for divaricating radiation from a source into a reference beam and a sample beam:

a. a rotary mechanical radiation attenuator mounted in the path of said reference beam for rotation about a first axis;

b. a rotary drive member mounted for rotation about an axis normally substantially coincident with said first axis;

c. coupling means drivingly connecting said drive member to said attenuator at a location radially spaced from said first axis; and d. means enabling displacement of the axis of said drive member relative to said first axis.

6. The combination defined in claim 5 wherein said coupling means includes:

a. a first member fixed with respect to, and rotatable about said first axis with, said attenuator; and b. a second member fixed with respect to, and rotatable with, said rotary drive member, said first and second members engaging each other in sliding abutment, at a location radially spaced from said first axis.

7. The combination, as described in claim 6, wherein said drive member is a rotary shaft and said enabling means include:

a. respective bearings journaling the ends of said shaft, the bearing remote from said coupling means permitting angular displacement of the shaft about said bearing as a pivot point; and b. means adjustably mounting the other of said bearings to permit movement of the shaft in said plane between a first position in which the shaft axis coincides with said first axis and respective limit positions on either side of said first axis.

8. The combination defined in claim 7 wherein:

a. said second member is a radial arm on said drive shaft having one end fixed to said shaft and having an open slot in its other end; and b. said first member is an L-shaped bracket member disposed with one leg substantially parallel to said one axis and the other leg directed radially toward said one axis, the free end of the said one leg being fixedly mounted on said attenuator and the free end of the other leg carrying a pin slidably engaged in the slot of said radial arm.

9. The combination defined in claim 8 including means resiliently biasing said pin against one longitudinal edge of said slot.

10. In combination with a radiation measuring apparatus of the optical null type including means for divaricating radiation from a source into a reference beam and a sample beam:

a. a rotary mechanical radiation attenutor including an attenuator plate mounted in the reference beam for rotation about a first axis normal to the plane of the plate;

b. means forming an elongate image of the radiation source in said plane extending along a line perpendicular to said first axis, said line and axis defining a second plane normal to the first plane;

c. a drive shaft;

d. means mounting said drive shaft for rotation about an axis having a normal position coincident with said first axis and for displacement of its axis of rotation in said second plane in both directions from the normal position; and e. means establishing a lost-motion sliding abutment coupling between said drive shaft and attenuator plate at a location outside said second plane.

11. The combination defined in claim 10 wherein said mounting means enables angular displacement of said shaft about a center adjacent the end of the shaft remote from said first plane.

12. The combination defined in claim 10 wherein said coupling means is arranged so that lost motion occurs when said attenuator plate is positioned for maximum attenuation, whereby displacement of said shaft causes no rotation of either the shaft or the attenuator plate.

13. The combination defined in claim 10 wherein said coupling means is a pin and slot connection arranged so that the slot lies substantially in said second plane when said attenuator plate is positioned for maximum attenuation, whereby displacement of said shaft causes no rotation of either the shaft or the attenuator plate.

* * * * *

UNITED STATES PATENT AND TRADEMARK OFFICE
CERTIFICATE OF CORRECTION

PATENT NO. : 3,975,099
DATED : August 17, 1976
INVENTOR(S) : Leonard Harold Taylor It is certified that error appears in the above-identified patent and that said Letters Patent are hereby corrected as shown below:

Column 7, line 11, change "positioned" to --positional--.

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*